United States Patent [19]

Labeur

[11] 4,244,537
[45] Jan. 13, 1981

[54] ADJUSTABLE SENSOR RESPONSIVE TO VEHICLE ACCELERATION

[75] Inventor: Lucas Labeur, Heverlee, Belgium

[73] Assignee: N.V. Klippan S.A., Heverlee-Louvain, Belgium

[21] Appl. No.: 50,049

[22] Filed: Jun. 19, 1979

[30] Foreign Application Priority Data

Jun. 22, 1978 [DE] Fed. Rep. of Germany ....... 2827409

[51] Int. Cl.³ .................. A62B 35/02; B65H 75/48
[52] U.S. Cl. ............................................ 242/107.4 A
[58] Field of Search ................ 242/107.4 A, 107.4 R, 242/107.4 B, 107.4 C; 280/801–808; 297/478, 480

[56] References Cited

U.S. PATENT DOCUMENTS

| 3,944,162 | 3/1976 | Henderson | 242/107.4 A |
| 3,985,314 | 10/1976 | Booth | 242/107.4 A |
| 4,046,332 | 9/1977 | Wheeler et al. | 242/107.4 A |
| 4,050,644 | 9/1977 | Fohl | 242/107.4 A |
| 4,077,584 | 3/1978 | Lafont | 242/107.4 A |
| 4,085,905 | 4/1978 | Lindblad | 242/107.4 A |
| 4,087,059 | 5/1978 | Lindblad | 242/107.4 A |

FOREIGN PATENT DOCUMENTS 1029156  5/1966  United Kingdom ............. 242/107.4 A Primary Examiner—John M. Jillions
Attorney, Agent, or Firm—Roger H. Criss

[57] ABSTRACT

A vehicle sensitive seat belt retractor including two locking pawls acting on a single ratchet wheel and operable in response to actuation of a vehicle sensitive sensor. The pawls are positioned relative to the sensor so that the force required to lock the retractor is uniform regardless of the direction of the acceleration. Preferably, the support for the sensor includes two mutually adjustable parts, one of which carries a ring which supports the sensor, which is preferably a ball, and the other is connected to the retractor housing.

10 Claims, 3 Drawing Figures

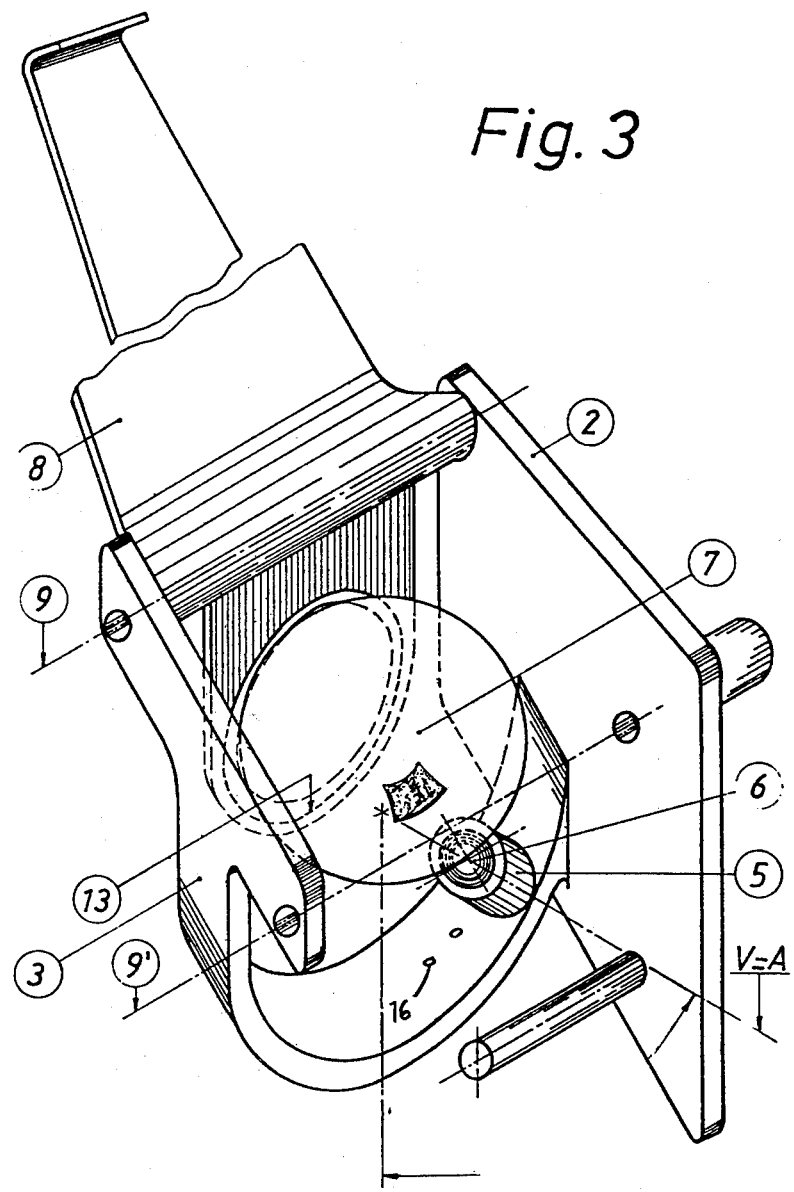

ADJUSTABLE SENSOR RESPONSIVE TO VEHICLE ACCELERATION

BACKGROUND OF THE INVENTION

1. Field of the Invention

This invention relates to an adjustable vehicle acceleration sensor useful in a seat belt winder (retractor).

2. Description of the Prior Art

In U.S. Pat. No. 4,039,158 to Weman, a winding device for a safety belt with a quick-acting lock is shown which has a pocket in a fastening mount and an inertial ball in the pocket. The pocket is open on one side, and when the vehicle is accelerated in one direction, the inertial ball moves out of the pocket and locks the winding shaft through a ratchet wheel.

For some time, there has been an increasing need to secure the belt winders not only on parts of the vehicle which are exactly horizontally or vertically arranged, but also on mounts arranged under an angle or on curved surfaces. If a mass produced belt winder is to be installed in different types of vehicles, it would be advisable to provide an adjustable belt winder, that is, a winder which can be installed under different angles, without having to utilize a separate belt winder for each mounting angle. In the above-mentioned known winding device, movable cylinders are therefore provided in the ring mount which can be turned with a screwdriver so that the belt winder can be adjusted to the corresponding mounting angle during the assembly.

On the other hand, there is a need for shortening the response time of the sensor device in the acceleration of the vehicle in one direction.

It has already been suggested in U.S. Pat. No. 4,176,809 to mount the inertial ball not in a pocket, as in the Weman patent, but on a trough with a sharp edge, hence on a ring facing to the inertial ball. Though the older suggestion, and also the present invention speaks substantially of an inertial ball, the latter can have a somewhat modified geometric form, provided it is rollable. Due to this suggestion with the relatively sharp edging on which the inertial ball is centered in its rest position, the manufacturing tolerances are no longer critical because the bearing surface of the inertial body on the respective ring is formed by its inner edge, which can even be oval. Without costly finishing of the support, a rapid response of the locking mechanism is thus ensured in an accident, and the inertial ball is also returned rapidly into its rest position. The uncertainty zone of the engagement between the pawl and ratchet wheel is thus kept very small. But the curved, preferably circular sharp edge on which the inertial ball is centered in its rest position is particularly functional only when the axis of the imaginary plane placed through the sharp ring edge is vertical. This, however, is responsible for the problem of adjustability to different angles.

In addition, the force necessary to displace the pawl by movement of the inertial ball is not uniform in all directions, but is somewhat increased in the direction of the major axis of the pawl. This is undesirable since it may result in too early an actuation in the other directions or too late an actuation in the said direction.

It would be desirable to provide a uniformly multidirection acceleration sensor for a seat belt retractor. It would also be desirable to provide a sensor device responding to vehicle acceleration adjustable in the above described manner, while maintaining the advantage of a rapidly achieved locking position and the rapid return of the inertial body, that is, the bearing on the ring.

SUMMARY OF THE INVENTION

In accordance with the present invention, there is provided in a seat belt retractor including a sensor responsive to vehicle acceleration and locking means operable to lock the retractor against movement in the protraction direction at an acceleration above a predetermined acceleration, the improvement comprising the locking means being comprised of two pawls operable to lock a single ratchet means in response to actuation of the sensor, the pawls being positioned relative to the sensor so that the force required to lock the retractor upon the acceleration above the predetermined acceleration is uniform regardless of the direction of the acceleration. The pawls are preferably placed on opposite sides of the sensor, which preferably is in the form of an inertial ball, and are adapted to lock alternatively in response to acceleration forces acting in directions along the major planes of the pawls.

In addition, in a preferred embodiment, the support for the sensor includes two mutually adjustable parts, one of which carries a ring which supports the sensor and the other is connected to the housing of the retractor. The sensor is therefore adjustable.

Other advantages, features and possible applications of the present invention will result from the following description with reference to the drawings.

BRIEF DESCRIPTION OF THE DRAWINGS

FIG. 3 shows the same representation as in FIG. 1, but in a different embodiment of the invention.

Figure 1:
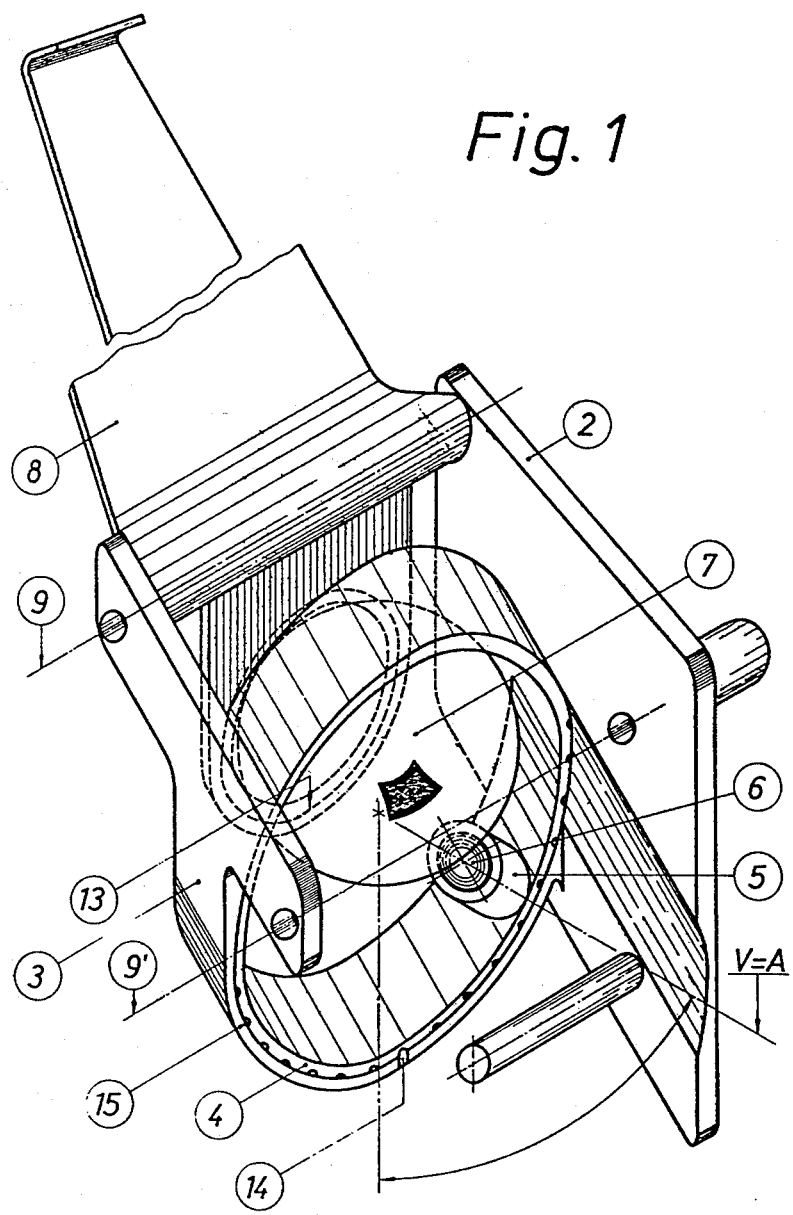
FIG. 1 shows schematically in a perspective view the important parts of the sensor device according to the invention in a first embodiment.

As mentioned above, one of the problems of the prior art is solved by providing a support with two mutually adjustable parts, one of which carries the ring holding the inertial body, while the other is connected with the housing of the belt winder. Due to these measures, the mounting for the inertial ball can be adjusted practically in any position by moving one support part relative to the other, so that the sensor device according to the invention is adjustable. In this way a sensor device is provided with a rapid response and the capacity of rapidly returning an inertial ball, which has been moved out of its rest position by acceleration, back into its rest position. Considering the practical conditions in the manufacture and the possibilities with low production costs, the two-part design of the support permits an adjustment up to 70 degrees from the vertical, while heretofore an adjustment of only up to 20 degrees was possible. The angle indicated here is between the vertical and the above-defined axis of the ring. In other words, this axis is formed by the connection of the following two points: (1) the center of the sharp edge designed in the ideal case as a ring, and (2) the center of the inertial ball resting on the ring in rest position.

In an advantageous further development of the invention, the retaining ring supporting the ball has the form of a crater edge which is provided on a surface of a tube, a cylinder or a partial cylinder. Two embodiments of the invention are described below. Both are characterized in that the ring for mounting the inertial ball is designed as a crater edge in its rest position, and the entire crater or depression which defines the ring edge can be considered a truncated cone with a hole or a cylindrical tube. In one embodiment, this tube forms one part of the support, which can be arranged adjustably in different positions on the other part which is connected with the housing of the belt winder. In the other embodiment, the part with the crater edge, unlike the part secured on the housing, is designed as a partial cylinder or as a hollow cylinder or a short, ring-shaped cylinder in an embodiment to be described below, where either the crater edge is molded on directly, or a tube with the crater edge is provided. The tube may have any form in other embodiments as long as the crater edge or the ring is round.

According to the invention, two pawls are mounted rotatably on the stationary part of the support secured on the housing, on both sides of the inertial ball. The pawls, which are preferably prestressed into the unlocked position by springs, weights, etc. which are attached or molded on, improve considerably the certainty that the locking will take place in any case as desired, if an admissible acceleration is exceeded in one direction, even if the sensor device is mounted obliquely on a mount tilted within admissible limits from the vertical, but adjusted to the angle. There are cases conceivable where the sensor device is so inclined that one pawl is not positively deflected when the ball is displaced from the horizontally adjusted crater edge and comes in locking engagement with the ratchet wheel to lock the belt winder. However, if two pawls are mounted rotatably on two different sides, preferably opposite sides of the inertial ball, one pawl will always respond to the movement of the inertial ball.

A preferred embodiment of the invention is characterized in that the two cylinders of the support have at least partial area contact with each other and are provided with locking means on their contact surfaces. In this embodiment, the support consists of two partial cylinders or full cylinders. But it is also conceivable that one cylinder, preferably the stationary cylinder, secured on the housing, is designed merely as a half cylinder embracing the sensor device only partly, while the inner cylinder is designed as a full cylinder. The inner cylinder carries the crater edge, e.g. a tube with a recess. For the adjustability according to the invention, it is important that the imaginary plane passing through the crater edge can be brought into the horizontal. This is done in the above-described embodiment by displacing one cylinder relative to the other, after which the desired position of the two cylinders is locked by locking means. Any conventional locking means may be utilized.

It is particularly expedient if recesses for receiving a projection secured on the stationary support part are provided on the outer circumferential surface of the inner cylindrical rotatable support part. Naturally the locking means can also be arranged in reverse, that is, the projection can be arranged on the rotatable support part and engage recesses arranged, for example, in an angular range of 180 or 270 degrees or the like on the inner circumference of the outer stationary cylinder. The fineness of the adjustment can be varied depending on the angular arrangement of these recesses.

It is also of advantage according to the invention if fastening means for the tube provided with the crater edge are arranged in the second embodiment along the inner circumferential surface of the stationary part of the support. As fastening means there may be provided a number of holes, blind bores or other suitably shaped recesses along the circumference on the inner side of the stationary support part, into which can be inserted a pin or projection arranged on the side of the tube opposite the surface bearing the crater edge. The adjustment is then so effected that one pulls out the tube and inserts it in the respective recess, which permits the horizontal position of the imaginary plane to be placed through the crater edge.

Figure 2:
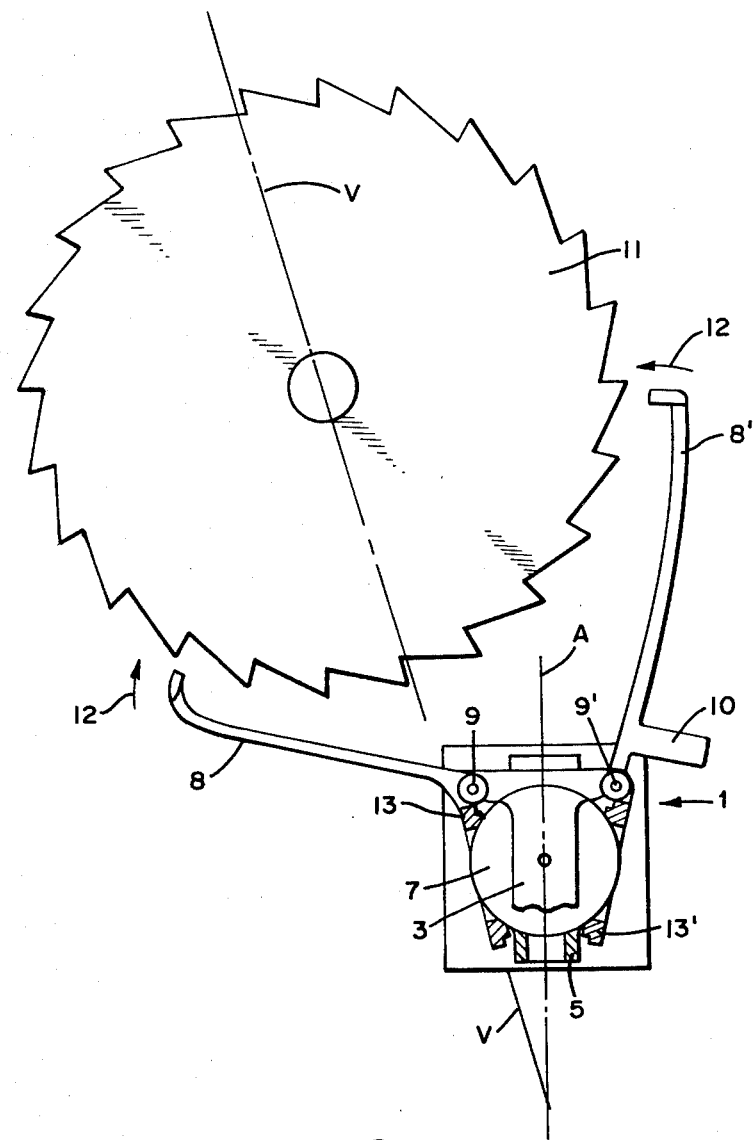
FIG. 2 shows the general arrangement of the sensor device with pawls.

With respect to the drawings, the sensor device shown in FIGS. 1 and 3 is generally designated by numeral 1 in FIG. 2. In order to be able to represent the principle of the invention in a simpler and clearer manner, only a base plate 2 which is secured on a housing (not shown) of the belt winder of sensor device 1, and a support 3 and 5 in the other embodiment according to FIG. 3, is shown. This support has mutually adjustable parts, namely in both embodiments the stationary parts 3 secured on the housing (not shown), and cylinder 4 with tube 5 and crater edge 6 in the embodiment according to FIG. 1 designed as a cylinder, and only tube 5 in the other embodiment according to FIG. 3 is designed as an adjustable part.

In the embodiment according to FIG. 1, the adjustable movable part is a cylinder 4, on the inside of which is secured a tube 5 which is provided with a depression preferably in the form of a truncated cone thereby defining a crater edge 6 on its side facing inertial ball 7. Inner cylinder 4 can be rotated relative to the outer stationary part which is in the form of a partial cylinder 3. The operation and the effect will be described below.

Pawls 8 and 8', which are rotatable about axes of rotation 9 and 9', are provided on two opposite sides of inertial ball 7, and are prestressed by their weight into the unlocked position. A very small weight suffices here, in pawl 8 a few grams of the relatively light pawl which may be formed of plastic, and in pawl 8', a small integral weight 10.

The free ends of pawls 8,8' engage the teeth of a single ratchet wheel 11 shown in FIG. 2 when they are deflected in the direction of arrows 12. Pawls 8,8' are provided with rings 13,13' which contact ball 7 with relatively sharp edges. For clarity, only ring 13 is shown in FIGS. 1 and 3.

As a locking means of the embodiment according to FIG. 1, there is provided a projection 14 secured on stationary support part 3, which can engage recesses 15, provided on the outer circumference of adjustable cylinder 4.

In the embodiment according to FIG. 3, the stationary support part 3 is again in the form of a partial cylinder partially surrounding sensor device 1. In this case, tube 5 with its crater edge 6, is adjustable and a pin or projection (not shown), secured on the side of tube 5 opposite crater edge 6, is insertable into holes 16 provided along the inner circumferential surface of stationary part 3.

The operation of the present invention is as follows. Line V represents the vertical plane and line A denotes the axis of rotation of tube 5, that is, the above described and defined center axis, which is determined by two points, namely the center inside crater edge 6 and the center of inertial ball 7 when it is in its rest position. In the FIG. 2 position, sensor device 1 is not in the adjusted position because line A does not coincide with the vertical V.

In the embodiment according to FIG. 1, starting from the position in FIG. 2, the inner adjustable cylinder 4 is therefore rotated counterclockwise relative to stationary support part 3 until the imaginary plane placed through crater edge 6 is horizontal, or in other words, center line A coincides with the vertical. This situation is shown in FIG. 1.

In the embodiment according to FIG. 3, tube 5 is moved out of one opening 16 on stationary support part 3 and placed it into another opening 16, where the above-indicated conditions exist again, that is, axis A of tube 5 coincides with the vertical or, in other words, the imaginary plane passing through crater edge 6 is horizontal.

In both embodiments, inertial ball 7 is now on the circular line, namely on the crater edge, so that a certain minimum acceleration must first act on the sensor device to move the ball out of its rest position.

In both embodiments, in the rest position, the edges of rings 13,13' of pawls 8,8' are in contact with inertial ball 7. When ball 7 is displaced from is rest position and moves, with reference to FIG. 2, either to the left or right, either pawl 8 or 8' engages the teeth of ratchet wheel 11. Ratchet wheel 11 is thus stopped and the locking mechanism becomes effective. The winding shaft of the belt winder is blocked and the belt cannot be further extended, thus protecting the occupant. Pawls 8 and 8' are displaced an equal distance upon movement of inertial ball 7 in either direction in response to a predetermined acceleration of the ball (deceleration of the vehicle). In this manner, the force required to actuate the pawls, and thus lock the winder, is uniform regardless of the direction of the acceleration forces. Should inertial ball 7 be accelerated in a direction extending into or away from the sheet when viewing FIG. 2, both pawls 8 and 8' are actuated to lock ratchet wheel 11.

I claim:

1. In a seat belt retractor including a sensor responsive to vehicle acceleration and locking means operable to lock said retractor against movement in the protraction direction at an acceleration above a predetermined acceleration, the improvement comprising:
said locking means comprising two pivotably mounted pawls operable to lock a single ratchet wheel having peripheral ratchet teeth in response to actuation of said sensor, said pawls being positioned on opposite sides of said sensor so that the force required to lock said ratchet wheel upon acceleration above said predetermined acceleration is uniform regardless of the direction of said acceleration.

2. The retractor of claim 1 wherein said sensor comprises a ball and said pawls are positioned on opposite sides of said ball.

3. The retractor of claim 1 wherein said sensor comprises a ball, said ball being supported in its rest position on a retaining ring.

4. The retractor of claim 3 wherein said retaining ring is provided on adjustable means which is adjustable to position said ball in line with the vertical plane of said retractor.

5. The retractor of claim 4 including a support for said ball and pawls and wherein said adjustable means is adjustable with respect to said support.

6. The retractor of claim 5 wherein said support includes a cylindrical surface, and further including a cylinder in contact with and rotatable with respect to said cylindrical surface, said adjustable means being mounted on said cylinder.

7. The retractor of claim 6 wherein said adjustable means is in the form of a tube, one end of which is in contact with said cylinder and the other end of which comprises said retaining ring.

8. The retractor of claim 7 including locking means on at least one of said cylindrical surface and said cylinder for maintaining the position of said adjustable means.

9. The retractor of claim 5 wherein said adjustable means is in the form of a tube, one end of which is in contact with said support and the other end of which comprises said retaining ring, said support being in the form of a cylindrical surface, and locking means provided on said other end of said tube and said support for maintaining the position of said tube after adjustment to said vertical plane.

10. The retractor of claim 3 wherein said retaining ring is in the form of a crater edge and including rings on said pawls in contact with said ball.

* * * * *